United States Patent
Lüdemann et al.

(10) Patent No.: US 9,144,873 B2
(45) Date of Patent: Sep. 29, 2015

(54) CODING ELEMENT FOR EQUIPPING AT LEAST ONE CAM CARRIER OF A ROTOR OF A ROTARY PRESS, AND METHOD FOR EQUIPPING A CAM CARRIER OF A ROTOR OF A ROTARY PRESS

(75) Inventors: Stefan Lüdemann, Hamburg (DE); Peter Lüneburg, Berkenthin (DE); Daniel Malick, Ahrensburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/115,790

(22) PCT Filed: Apr. 19, 2012

(86) PCT No.: PCT/EP2012/001685
§ 371 (c)(1),
(2), (4) Date: Dec. 17, 2013

(87) PCT Pub. No.: WO2012/152369
PCT Pub. Date: Nov. 15, 2012

(65) Prior Publication Data
US 2014/0083248 A1    Mar. 27, 2014

(30) Foreign Application Priority Data

May 10, 2011    (DE) .......................... 10 2011 101 292

(51) Int. Cl.
*B30B 11/02*    (2006.01)
*B30B 11/00*    (2006.01)
*B30B 11/08*    (2006.01)
*B29C 43/08*    (2006.01)
(Continued)

(52) U.S. Cl.
CPC .............. *B23Q 16/001* (2013.01); *B30B 11/08* (2013.01); *B30B 15/028* (2013.01); *Y10T 74/1488* (2013.01)

(58) Field of Classification Search
CPC .............................. B30B 11/08; B30B 15/028
USPC .................. 425/167, 171, 345; 700/197, 206; 264/40.1, 40.5
See application file for complete search history.

(56) References Cited

U.S. PATENT DOCUMENTS

| | | | |
|---|---|---|---|
| 6,122,565 A * | 9/2000 | Wenning et al. | 700/206 |
| 7,014,443 B2 | 3/2006 | Hinzpeter et al. | |
| 7,125,234 B2 * | 10/2006 | Scholz et al. | 425/167 |

(Continued)

FOREIGN PATENT DOCUMENTS

| | | |
|---|---|---|
| DE | 202005017516 | 1/2006 |
| DE | 102009020196 | 11/2010 |

(Continued)

*Primary Examiner* — Joseph S Del Sole
*Assistant Examiner* — Thu Khanh T. Nguyen
(74) *Attorney, Agent, or Firm* — Vidas, Arrett & Steinkraus, P.A.

(57) ABSTRACT

The invention relates to a coding element for equipping at least one cam carrier of a rotor of a rotary press with at least one control cam element, wherein at least one coding element is provided, wherein the at least one coding element comprises fastening means by which it can be fastened to the rotor or a component connected thereto, wherein the at least one coding element has coding means by which the position of the at least one control cam element on the cam carrier is clearly specified. In addition, the invention relates to a corresponding method.

21 Claims, 2 Drawing Sheets

Figure 1:
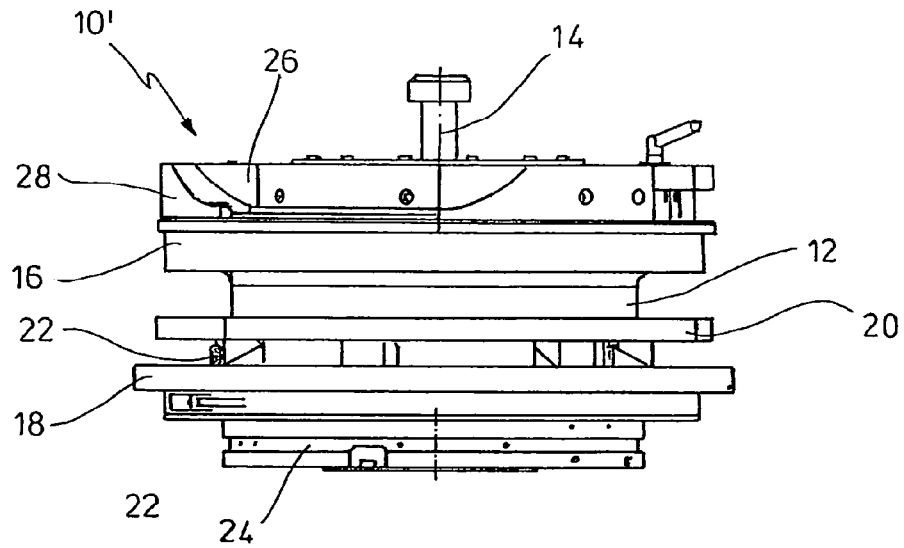

(51) Int. Cl.
   *B23Q 16/00*   (2006.01)
   *B30B 15/02*   (2006.01)

(56) References Cited

U.S. PATENT DOCUMENTS 7,713,469 B2 * 5/2010 Schmidt et al. ............... 425/143

2002/0192330 A1   12/2002   Bunkers et al.
2009/0139417 A1   6/2009    Lueneburg et al.

FOREIGN PATENT DOCUMENTS

| EP | 1338409 | 8/2003 |
| EP | 2065176 | 6/2009 |
| JP | 2001219329 | 8/2001 |

* cited by examiner

CODING ELEMENT FOR EQUIPPING AT LEAST ONE CAM CARRIER OF A ROTOR OF A ROTARY PRESS, AND METHOD FOR EQUIPPING A CAM CARRIER OF A ROTOR OF A ROTARY PRESS

CROSS-REFERENCE TO RELATED APPLICATIONS

This application is a national stage of PCT/EP2012/001685 filed on Apr. 19, 2012 claiming the priority of German Patent Application No. 10 2011 101 292.7, dated May 10, 2011, the entire contents of each of which is incorporated by reference.

STATEMENT REGARDING FEDERALLY SPONSORED RESEARCH

Not applicable

BACKGROUND OF THE INVENTION

The invention relates to a coding element for equipping at least one cam carrier of a rotor of a rotary press with at least one control cam element. The invention also relates to a control cam arrangement and a rotor for a rotary press. Furthermore, the invention relates to a method for equipping a cam carrier of a rotor of a rotary press with at least one control cam element.

Rotary presses and rotary tablet presses generally possess a rotor having an upper and lower punch guide and a die plate arranged therebetween. Furthermore, upper and lower control cams are provided that interact with the heads of upper and lower press punches of the rotary press, in particular in order to generate and guide the axial stroke of the upper and lower press punches. The control cams are generally constructed of a plurality of control cam elements that are fastened to a suitable cam carrier. Different control cam elements are assigned to the different stations of the rotary press, for example filling cam elements, dosing cam elements, pressure cam elements and ejection cam elements. It is very important for the cam carriers to be correctly equipped with control cam elements for the intended outfitting of the rotary press with stations. To prevent the cam carriers from being incorrectly equipped with control cam elements, the cam carriers are designed so that only a specific combination of control elements can be affixed thereto.

Different production states are supposed to be feasible with such rotary tablet presses. For example, it should be possible to change between the production of single-layer tablets and multilayer tablets. For such a change, it is generally necessary to also change the control cam elements. A rotary tablet press that is flexible to use therefore needs to permit different control cam combinations. Since the cam carriers are specially designed for just one combination of control cams, different cam carriers are therefore required for different control cam combinations. It is however involved to change a cam carrier. The precise position of the cam carrier is very important for the rotary press to operate. The cam carriers therefore possess elaborate fastening means with a plurality of fastening points. In addition, all the forces acting on the control cams during operation are absorbed by the cam carriers. Due to the high loads that therefore arise during operation, the cam carriers are stably designed and mounted and are very heavy. This design of the cam carriers renders changing them involved.

Based on the explained prior art, the object of the invention is to enable different combinations of control cams to be flexibly exchanged in an easy and reliable manner.

BRIEF SUMMARY OF THE INVENTION

For a coding element of the initially cited type, the invention achieves this object by providing at least one coding element, wherein the at least one coding element comprises fastening means by means of which it can be fastened to the rotor or a component connected thereto, and the at least one coding element has coding means by which the position of the at least one control cam element on the cam carrier is clearly specified.

For a method of the initially cited type, the invention achieves the object in that at least one coding element is fastened to the rotor or a component connected thereto, at least one control cam element is fastened to the cam carrier, wherein the position of the control cam element on the cam carrier is clearly specified by coding means of the at least one coding element.

As initially explained, rotary presses, especially rotary tablet presses, generally have upper and lower cam carriers—in addition to upper and lower punch guides and a die plate arranged therebetween—to which upper and lower control cam elements are fastened. The control cam elements interact with the heads of upper and lower press punches of the rotary press in order to generate and guide in particular the axial stroke of the press punches. As also mentioned above, different control cam elements such as filling cam elements, dosing cam elements, pressure cam elements and ejection cam elements are assigned to the different stations of the rotary press such as filling station(s), dosing station(s), compression station(s), and ejection station(s). Generally, a plurality of control cam elements are fastened to the upper cam carrier and lower cam carrier that then jointly form an upper and lower control cam.

According to the invention, at least one coding element is provided that can be fastened, or is fastened, with its fastening means to the cam carrier. The at least one coding element can also be a part of a multipart coding device that consists of a plurality of coding elements. The fastening means can provide a releasable fastening of the coding element, or a permanent fastening of the coding element, to the rotor or a component connected thereto. As stated at the outset, a conventional rotor can have a set of different cam carriers for different control cam combinations. The fastening means of the coding element according to the invention can therefore be designed such that they can always be fastened to each of the cam carriers to be provided on the rotor.

In contrast to the prior art, the cam carrier does not have to be exchanged according to the invention in order to change the control cam elements between different modes of operation or production states. Instead, the same cam carriers can be used according to the invention to fasten different control cam elements. The coding element according to the invention hence comprises coding means that offer a clear position assignment of a control cam element that is fastened to the control cam. For each control cam element, there is a clearly defined installation position on the cam carrier according to the invention that is specified by the cam coding element. In order to change between different arrangements of control cam elements, only the coding provided by the coding element has to be changed. As will be further explained below, this can be achieved for example by changing the coding element or shifting the coding element. The cam carrier is still used for fastening the control cam elements and absorbing the forces arising while the control cam elements are operating. The coding therefore occurs separately from the keyed and/or friction connection between the control cam elements and the cam carrier.

The use of a coding element according to the invention allows a rotary press, or individual rotor sets for such a rotary press, to be flexibly used. A rotor set can be equipped with almost any combination of control cams without having to remove and change a cam carrier. Since force continues to be transmitted in particular between the control cam element and the cam carrier, the coding element itself does not have to absorb any force. It can therefore be designed with a light and simple construction to position and fasten it. In addition, the same precision requirements as for the cam carrier do not exist in regard to the arrangement of the coding element. At the same time, the coding according to the invention and the unambiguous position assignment provided thereby makes it easier to install the control cam elements. Installation errors are prevented. A high number of equivalent parts is achieved since, in addition, the same cam carriers can be used for the different combinations of control cams, and since the control cam elements for different cam combinations can also have the same design. This has significant advantages in regard to availability, production costs and construction effort.

The coding element according to the invention can have a single-part or multi-part design. If it is designed with multiple parts, it can for example consist of several segments, preferably circular or annular segments. The advantage of a single part design, preferably in the form of a circular disk or annulus, is that mistakes fastening the coding element to the rotor, or the component connected thereto, that would cause an improper arrangement of the control cam elements are more reliably avoided.

As explained, a rotary press generally has an upper and a lower cam carrier for upper and lower control cam elements. Both cam carriers can each have at least one coding element according to the invention. A rotary press also has a so-called die plate with openings, especially die holes. The die plate can be designed as a single piece or be formed from individual segments. Die sleeves can be inserted in the openings or die holes. This is however not absolutely essential; instead, the press punches can also interact directly with the openings or die holes.

Furthermore, a plurality of control cam elements can be fastened to the cam carrier, wherein the position of all of these control cam elements on the cam carrier can be clearly specified by the coding means of the coding element. According to a particularly practical embodiment, the coding means can be mechanical coding means. Possible mechanical coding means are for example openings and/or projections. The projections can for example be in the form of coding bumps. Coding tabs are for example also conceivable. The openings can for example be designed in the form of notches or edge openings in the shape of annular segments. In addition to mechanical coding means, other coding means are also conceivable such as color codes, codes with transponders, etc.

According to another embodiment, the coding element can possess a ring shape or a disc shape. It can then be very easily placed on the cam carrier that generally extends in the peripheral direction of the rotor. The coding means can for example comprise a plurality of projections and/or openings of the above-described type distributed over the perimeter of the coding element.

In another embodiment, a plurality of coding elements are provided, wherein the coding elements are designed differently and are exchangeable; in particular, at least one coding element designed for these conditions is fastened directly or indirectly on the rotor and in particular in a clearly predetermined position for a different equipping of the rotor with control cam elements arising from a different required operating mode, or a different required production state.

According to another embodiment, the coding means of the coding element can be adjusted between at least two different coding settings, wherein the coding means in the at least two different coding settings clearly specifies different positions of the at least one control cam element on the cam carrier. Correspondingly, the coding means of the coding element can be adjusted between at least two different coding settings to change the equipping of the cam carrier with control cam elements, wherein the coding means in the at least two different coding settings clearly specify different positions of the control cam elements on the cam carrier. In this embodiment, the coding element can be securely connected to the rotor or the cam carrier. A different coding for differently equipping the rotor with control cam elements in a different operating mode can then be achieved by adjusting the coding means between the different coding settings or coding positions. Depending on the selected setting, a specific control cam configuration is allowed to be fastened on the cam carrier.

According to a different embodiment, the coding element comprises identification means with identification data that allow the coding elements to be clearly identified. According to a different embodiment, the identification means can comprise transmission means by which the identification data can be transmitted to a control device of the rotary press. On the basis of the provided identification communicated to the control device of the respective coding element, the control device can select a suitable control program for operating the rotary press appropriate for the control cam configuration specified by the coding element. In addition, it can thereby be checked if the correct coding element and hence the correct control cam arrangement was selected for the desired operating mode of the rotary press. For these purposes, the identification means can comprise a memory device. The transmission means can always comprise a wired or wireless connection to the control device of the rotary press. The transmission means can for example comprise one or more transponders.

The coding element can be fixed at a predetermined position and fastened on the rotor or a component connected thereto. Fixed in position means both an immovable, preferably keyed retention directly or indirectly on the rotor as well as a specified and unambiguous alignment relative to the rotor. The coding element can in particular comprise second coding means that specify a distinct position of the coding element to be fastened to the rotor or the component connected thereto. The second coding means can on the other hand be mechanical coding means. On the other hand, the second coding means can comprise a projection or opening of the above-described type. With this embodiment, a position of the coding element on the rotor, or the component connected thereto such as the cam carrier, can be clearly specified. A malpositioning of the coding element and a consequential malpositioning of the control cam elements are avoided.

The invention also relates to a control cam arrangement for a rotor of a rotary press comprising at least one control cam element fastened to a cam carrier, and at least one coding element according to the invention, wherein the control cam element comprises coding means that correspond to the coding means of the coding element for clearly specifying the position of the control cam element on the cam carrier. The coding means of the control cam element hence interact with the (first) coding means of the coding element to clearly specify the position of the control cam element on the cam carrier. Accordingly, the coding means of the control cam element can also be mechanical, for example. Furthermore, it can have one or more projections and/or openings of the above-described type.

The control cam arrangement can comprise a plurality of coding elements, wherein the fastening means provide a releasable fastening of the coding elements to the rotor or a component connected thereto, wherein the coding elements comprise different coding means, and wherein the different coding means clearly specify different positions of the at least one control cam element on the cam carrier. Accordingly, different coding elements can be fastened to the rotor or a component connected thereto to change the equipping of the cam carrier with control cam elements, wherein the different coding elements comprise different coding means, and wherein the different coding means clearly specify different positions of the control cam elements on the cam carrier. In this embodiment, the coding suitable for a desired operating mode of the rotary press and the control cam arrangement suitable therewith are selected by a change between different coding elements. Each coding element can therefore be provided for a specific arrangement of position of the control cam elements. It is thereby particularly easy to code the rotor for different operating modes, and a particularly high level of operational safety is achieved against malpositioning the control cam elements.

The invention also relates to a rotor for a rotary press comprising an upper and a lower punch guide for upper and lower press punches, as well as for a die plate arranged between the punch guides, further comprising an upper and lower cam carrier on which at least one control cam element is fastened in each case, and comprising at least one upper control cam arrangement designed in the manner according to the invention, and/or at least one lower control cam arrangement designed in the manner according to the invention. In addition, the fastening means of the coding elements can be provided to fasten to the upper and/or lower cam carrier, and the upper cam carrier and/or lower cam carrier comprises coding means corresponding to the second coding means of the coding elements. The upper and lower cam carriers work together with the coding element assigned to them such that the respective coding element is fastened to the respective cam carrier at a specific position. This prevents the control cam elements from being malpositioned. The coding means of the cam carrier can also be mechanical. Furthermore, they can on the other hand have one or more projections and/or openings of the above-described type.

The method according to the invention can be implemented with the devices according to the invention, especially the at least one coding element, and/or the control cam arrangement and/or the rotor.

BRIEF DESCRIPTION OF THE SEVERAL
VIEWS OF THE DRAWINGS

Figure 2:
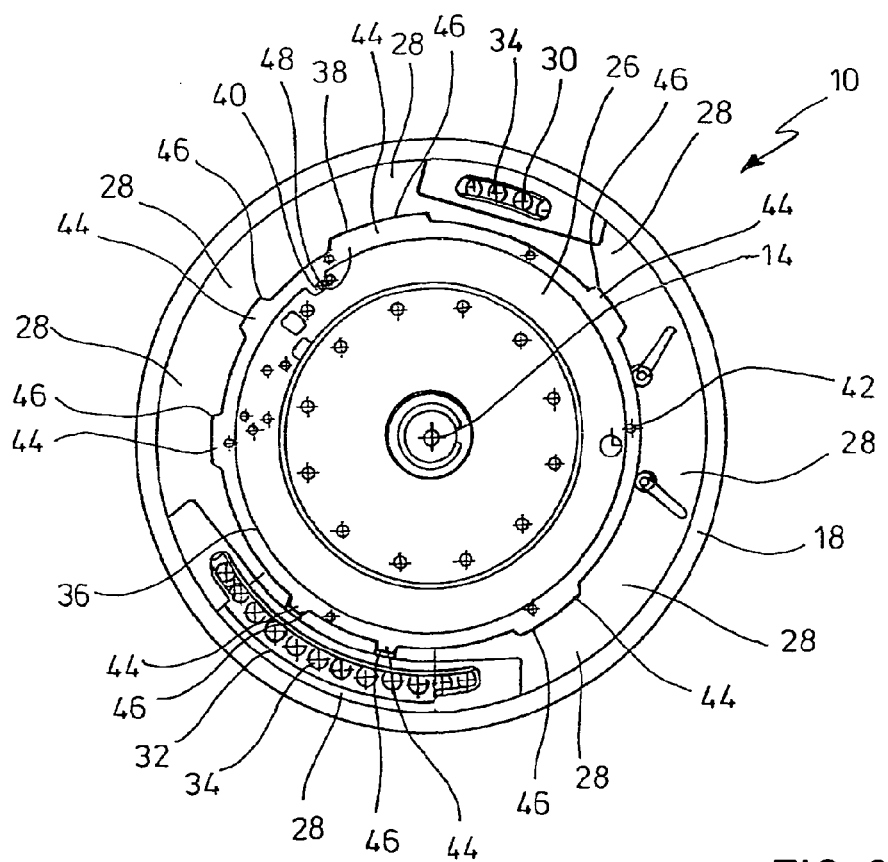
Figure 3:
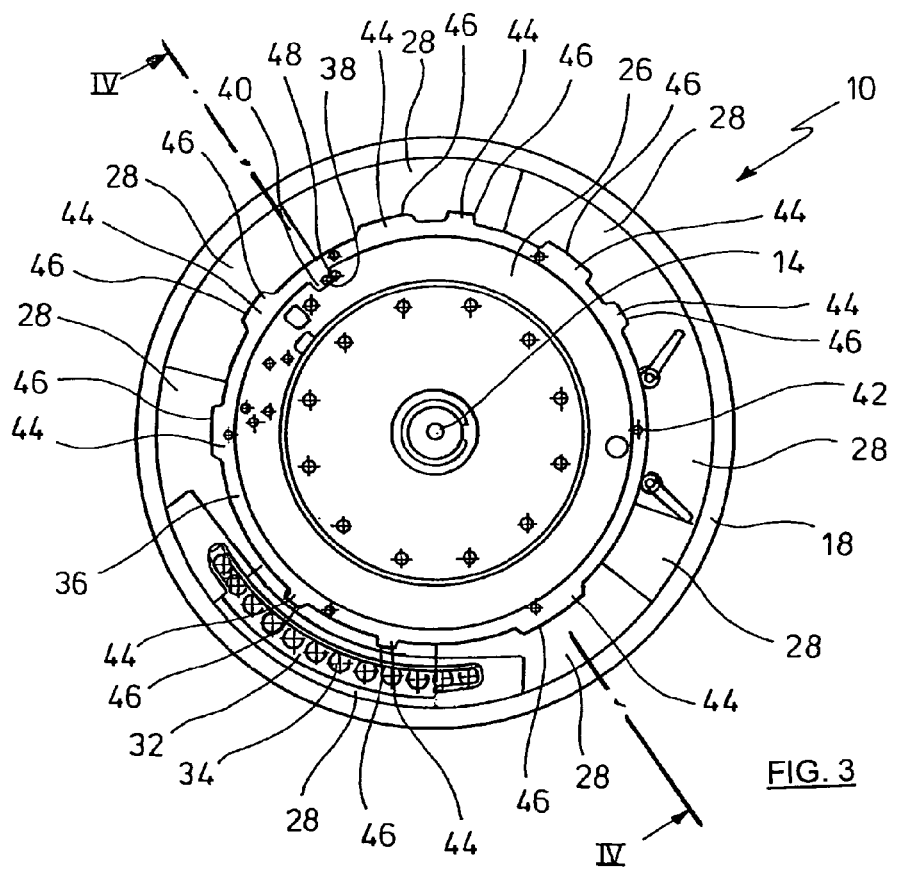
Figure 4:
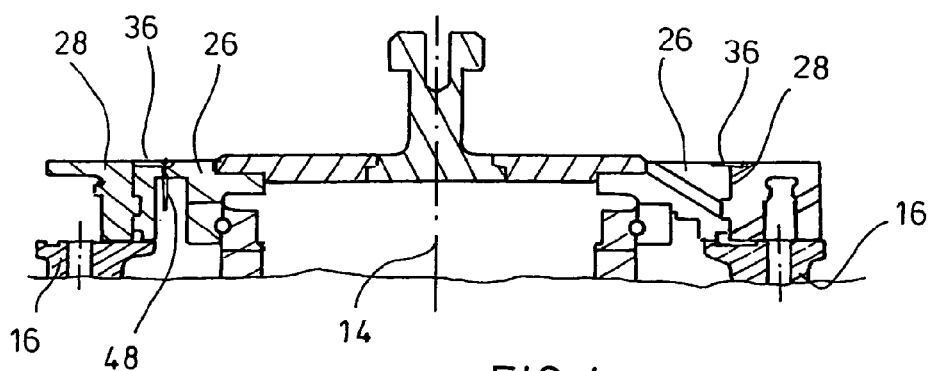

Exemplary embodiments of the invention are explained below in greater detail with reference to figures. They show schematically:

FIG. 1 A rotor of a rotary tablet press according to the prior art,

FIG. 2 A plan view of a rotor according to the invention in a first operating mode, FIG. 3 A plan view of the rotor from FIG. 2 in a second operating mode, and FIG. 4 A meridian section of the rotor shown in FIG. 3 along section A-B in FIG. 3.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

If not otherwise specified, the same reference numbers indicate the same objects in the figures. FIG. 1 discloses a conventional rotor 10' of a rotary press or a rotary tablet press. It comprises a rotor element 12 that, by means of a rotary drive (not shown), can be rotated about a rotary axis shown in FIG. 1 with reference number 14, generally a vertical axis. The rotor 10' also comprises an upper punch guide 16 for the upper press punch, and a bottom punch guide 18 for the bottom press punch. The shafts of the press punches are movably guided in an axial direction in the upper and lower punch guides 16, 18. The press punches are not shown in FIG. 1 for reasons of clarity. A die plate 20 is arranged between the upper punch guide 16 and lower punch guide 18. The die plate 20 is fastened to the lower punch guide 18 in the portrayed example by means of tensioning wedges 22 that engage with each other. The die plate 20 can be designed as a single part or consists of several segments. The die plate 20 possesses openings for the press punch, especially die holes. Die sleeves can be arranged in the openings. This is however not absolutely necessary; the press punches can also interact directly with the die holes. At the bottom end in FIG. 1, the rotor possesses a lower cam carrier 24. FIG. 1 shows an upper cam carrier 26 above the upper punch guide 16. A plurality of control cam elements 28 are fastened to the upper cam carrier 26. The control cam elements 28 each possess an opening, in the present case a guide opening, in which the press punch heads are guided to define the axial movement of the press punches while the rotary press is operating. Of course, corresponding lower control cam elements can be provided on the lower cam carrier 24.

FIG. 2 discloses a rotor 10 according to the invention of a rotary press or a rotary tablet press. Its design largely corresponds to the rotor 10' shown in FIG. 1. It can be seen in FIG. 2 that the control cam elements 28 are a plurality of control cam segments extending over a part of the perimeter of the rotor. It can also be seen that the control cam elements have unbroken openings 30, 32 designed as penetrations in the region of compression stations of a rotary press. In the region of these openings 30, 32, the pressure rollers arranged above the upper control cam elements 28 can act directly on the press punch 34 shown in FIG. 2. In contrast to the known rotor 10' shown in FIG. 1, the rotor according to the invention from FIG. 2 has a coding element 36 in the form of a coding ring. The coding element 36 is fixed in a predetermined rotary position relative to the cam carrier 26 and fastened thereto. The cam carrier 26 has an edge opening 38. The coding element 36 possesses a corresponding projection 40 radially to the inside that, when the coding element 36 is in the correct rotary position, engages in the opening 38 radially to the outside, in this case an edge opening, of the cam carrier 26. The coding element 36 is connected in this position to the cam carrier 26 by a plurality of connecting means 42, preferably threaded connections. The coding element 36 also comprises a plurality of projections 44 radially to the outside distributed over its perimeter. These projections 44 form coding means that interact with the corresponding openings 46 radially to the inside, edge openings in the present case, in the control cam elements 28. In particular, by suitably selecting and arranging the projections 44 and openings or edge openings 46 for each control cam element 28, a clearly defined installation position is specified for fixing the position and fastening to the cam carrier 26. As can be seen in particular in the sectional view in FIG. 4, the control cam elements 28 are also thereby fastened to the cam carrier 26. The coding element 36 does not participate in the fastening of the control cam elements 28 to the cam carrier 26. The forces arising during operation are also almost completely conducted into the cam carrier 26 by the control cam elements 28. In comparison to the cam carrier 26 and control cam elements 28, the coding element 36 only possesses a small dimension in an axial direction and, in a preferred embodiment, serves as an annular template only to establish the position of the corresponding control cam elements 28.

Identification means 48 of the coding element 36 can also be seen in FIG. 4. They contain identification data that permit the coding element 36 inserted in the rotor 10 to be clearly identified. The identification means 48 also comprise transmission means by which the identification data can be transmitted wirelessly or by wire to a control device (not shown) of a rotary press to be equipped with the rotor 10. On this basis, the control device can check whether the coding element 36 suitable for the respective operating state of the rotary press is installed. In addition, the control device can choose the correct control program for the rotary press depending on the installed coding element 36.

Whereas the rotor 10 in FIG. 2 is configured for operating a rotary press with three compression stations in the region of the openings 30, 32, the rotor from FIG. 2 is shown in a different configuration in FIG. 3. In the configuration according to FIG. 3, the rotary press is only provided with two compression stations for operation. The control cam elements 28 used in FIG. 3 only have one opening 32. To achieve the configuration from FIG. 3, a different coding element 36 was fastened to the cam carrier 26 in contrast to the operating state disclosed in FIG. 2. This coding element 36 is in turn designed as a coding ring and only differs from the coding element 36 shown in FIG. 2 in terms of the embodiment and arrangement of the projections 44 on its perimeter. This altered design of the coding means of the coding element 36 requires a different arrangement of the control cam elements 28, wherein in the example in FIG. 3, in particular the opening 30 encompassing the two control cam segments is omitted in comparison to the example in FIG. 2.

By exchanging the coding elements 36, a number of different configurations of the control cam elements 28 can be achieved. The cam carrier 26 can thereby always remain on the rotor 10. An involved uninstallation of the cam carrier 26 is not necessary. Of course, corresponding coding elements 36 can be provided on the lower cam carrier of the rotor 10 to configure different arrangements of control cam elements 28.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A coding element for equipping at least one cam carrier (26) of a rotor (10) of a rotary press with at least one control cam element (28), characterized in that at least one coding element (36) is provided, wherein the at least one coding element (36) comprises fastening means by which it can be fastened to the rotor (10) or a component connected thereto, and the at least one coding element (36) has coding means by means of which the position of the at least one control cam element (28) on the cam carrier (26) is clearly specified; wherein the coding means are mechanical coding means.

2. The coding element according to claim 1, characterized in that the coding means clearly specify the position of a plurality of control cam elements (20) on the cam carrier (26).

3. The coding element according to claim 1, characterized in that it possesses a ring shape or a disc shape.

4. The coding element according to claim 1, characterized in that the coding means has a plurality of projections (44) and/or openings distributed over the perimeter of the coding element (36).

5. The coding element according to claim 1, characterized in that the coding means of the coding element (36) can be adjusted between at least two different coding settings, wherein the coding means in the at least two different coding settings clearly specify different positions of the at least one control cam element (28) on the cam carrier (26).

6. The coding element according to claim 1, characterized in that a plurality of coding elements (36) are provided, wherein the coding elements (36) are designed differently and are exchangeable.

7. The coding element according to claim 1, characterized in that it comprises identification means (48) with identification data that allow a clear identification of the coding element (36).

8. The coding element according to claim 7, characterized in that the identification means (48) comprises transmission means by which the identification data can be transmitted to a control device of the rotary press.

9. The coding element according to claim 1, characterized in that the coding element (36) comprises second coding means that specify an unambiguous position of the coding element (36) for fastening to the rotor (10) or a component connected thereto.

10. The coding element according claim 9, characterized in that the second coding means are mechanical coding means.

11. The control cam arrangement for a rotor (10) of a rotary press comprising at least one control cam element (28) fastened to a cam carrier (26), and at least one coding element

(36) according to claim 1, wherein the control cam element (28) comprises coding means that correspond to the coding means of the coding element (36) for clearly specifying the position of the control cam element (28) on the cam carrier (26).

12. The control cam arrangement according to claim 11, characterized in that it comprises a plurality of coding elements (36), wherein the fastening means provide a releasable fastening of the coding elements (36) to the rotor (10) or a component connected thereto, wherein the coding elements (36) comprise different coding means, and wherein the different coding means each clearly specify different positions of the at least one control cam element (28) on the cam carrier (26).

13. A rotor for a rotary press comprising an upper and a lower punch guide (16, 18) for upper and lower press punches (34), as well as a die plate (20) arranged between the punch guides (16, 18), further comprising an upper cam carrier (26) and lower cam carrier (24) on which at least one control cam element (28) is fastened in each case, and comprising an upper and/or lower control cam arrangement according to claim 11.

14. The rotor according to claim 13, wherein the coding element (36) comprises second coding means that specify an unambiguous position of the coding element (36) for fastening to the rotor (10) or a component connected thereto, the fastening means of the coding elements (36) are provided to fasten to the upper and/or lower cam carrier (26), and the upper and/or lower cam carrier (26) comprise coding means corresponding to the second coding means of the coding element (36).

15. A method for equipping a cam carrier (26) of a rotor (10) of a rotary press with at least one control cam element (28), characterized by the steps:

At least one coding element (36) is fastened to the rotor (10) or a component connected thereto, At least one control cam element (28) is fastened to the cam carrier (26), wherein the position of the control cam element (28) on the cam carrier (26) is clearly specified by coding means of the at least one coding element (36).

16. The method according to claim 15, characterized in that a plurality of control cam elements (28) are fastened to the cam carrier (26), wherein the position of all the control cam elements (28) on the cam carrier (26) is clearly specified by the coding means of the coding element (36).

17. The method according to claim 16, characterized in that the coding means of the coding element (36) is adjusted between at least two different coding settings to change the equipping of the cam carrier (26) with control cam elements (28), wherein the coating means in the at least two different coding settings clearly specify different positions of the control cam elements (28) on the cam carrier (26).

18. The method according to claim 16, characterized in that different coding elements (36) are fastened to the rotor (10) or a component connected thereto to change the equipping of the cam carrier (26) with control cam elements (28), wherein the different coding elements (36) comprise different coding means, and wherein the different coding means clearly specify different positions of the control cam elements (28) on the cam carrier (26).

19. The method according to claim 15, characterized in that the coding element (36) is clearly identified by means of identification data.

20. The method according to claim 19, characterized in that the identification data for identifying the coding element (36) are transmitted to a control device of the rotary press.

21. The method according to claim 15,
wherein the rotor comprises:
an upper and a lower punch guide (16, 18) for upper and lower press punches (34);
a die plate (20) arranged between the punch guides (16, 18); and
wherein the cam carrier (26) of the rotor (10) comprises an upper cam carrier (26) and a lower cam carrier (24) on which the at least one control cam element (28) is fastened in each case,
the rotor further comprising a control cam arrangement that comprises an upper and/or lower control cam arrangement, wherein the control cam arrangement comprises:
the at least one control cam element (28) fastened to a cam carrier (26); and
the at least one coding element (36);
wherein the control cam element (28) comprises coding means that correspond to the coding means of the coding element (36) for clearly specifying the position of the control cam element (28) on the cam carrier (26);
wherein the at least one coding element (36) comprises fastening means by which it is fastened to the rotor (10) or a component connected thereto, and
wherein the coding means of the at least one coding element (36) are mechanical coding means.

* * * * *